June 2, 1964

W. BELL 3,135,522

DRILL CHUCK

Filed Nov. 7, 1961

INVENTOR.
WALTER BELL

BY
Friedman & Goodman
ATTORNEYS

United States Patent Office 3,135,522
Patented June 2, 1964

3,135,522
DRILL CHUCK
Walter Bell, Monroe, N.Y., assignor to Star Expansion Industries Corporation, Mountainville, N.Y., a corporation of Delaware
Filed Nov. 7, 1961, Ser. No. 151,418
5 Claims. (Cl. 279—97)

The present invention relates in general to a tool holder and in particular to a chuck for a twist drill or the like.

In various manufacturing operations which use a twist drill or the like, it frequently becomes necessary to change the drill due to wear, breakage or the necessity to use a drill having a slightly different diameter than the one being used. It is important that this can be accomplished with a minimum amount of time in order not to lose any production time and consequently to keep down the manufacturing cost. Furthermore, it is highly desirable that the change of a drill or a similar tool can be accomplished without the necessity of using tools to effect such change, which again tends to save time and also reduces the cost of the manufacturing operations in that additional tools need not be purchased for use only when it is necessary to change a drill.

In view of the foregoing, it is an object of the present invention to overcome the disadvantages of the prior art relating to the changing of twist drills or the like in a machine tool or the like.

It is another object of the present invention to greatly facilitate the time within which a twist drill can be removed from and a new one inserted into a chuck or the like.

It is a further object of the present invention to provide for a chuck in which a twist drill can be inserted or removed manually without the necessity for utilization of any type of insertion or removal tool.

Other and further objects, benefits and advantages of the present invention will become readily apparent to one skilled in the art from reading the following specification taken in connection with the appended drawings.

In the drawings which illustrate the best mode presently contemplated for carrying out the invention:

Figure 1:
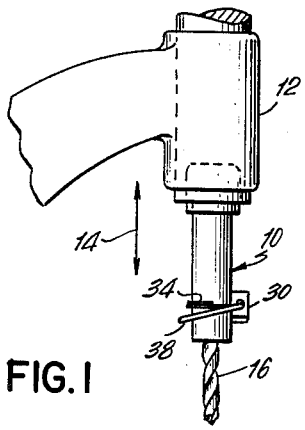
FIGURE 1 is a view in elevation illustrating a tool such as a twist drill provided in a chuck pursuant to the present invention, said chuck being mounted in a suitable machine tool for operating the drill.
Figure 2:
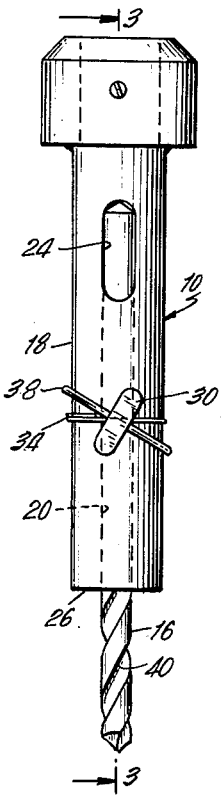
FIGURE 2 is a view in elevation on an enlarged scale showing a chuck pursuant to the present invention provided with a drill.
Figure 3:
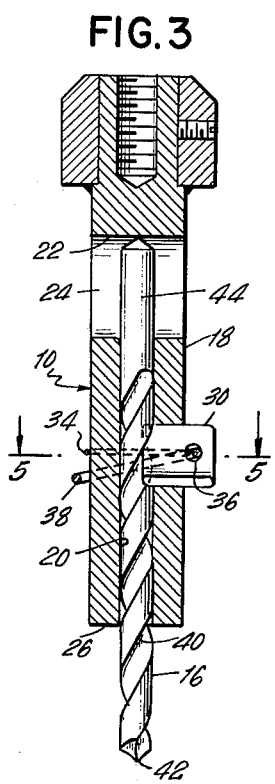
FIGURE 3 is a longitudinal sectional view taken on the line 3—3 of FIGURE 2.

Referring now to the drawings in detail, there is illustrated a chuck 10 pursuant to the present invention, said chuck being shown in FIGURE 1 as mounted in a suitable machine tool 12 which may be raised and lowered as illustrated by the arrows 14 for moving a twist drill 16 to and from a work position.

As here shown, the chuck 10 is constituted by an elongated cylindrical body or member 18 which is provided with an axial bore 20. The bore 20 is dimensioned to receive a twist drill 16. The bore 20 terminates at the upper wall 22 of a transverse elongated slot 24. Pursuant to a feature of the present invention, the chuck body 18 is provided between the slot 24 and its lower end 26 with a transverse aperture 28 which extends from the outer surface of the chuck body 18 to the bore 20. The aperture 28 is angularly disposed relative to the axial bore 20. A key 30 is movably mounted within the transverse aperture 28 and is biased into position to dispose its inner end 32 within the bore 20 by means of an annular spring 34 which encompasses the chuck body 18 and which extends through an aperture 36 provided in the key 30. A rigid ring 38 also encompasses the chuck body 18 and extends through the key aperture 36. The drill 16, which is of conventional construction, is provided with a helical flute 40 which extends from the lower drill end 42 upwardly toward the drill shaft 44. It will be noted that the end 32 of the key 30 is shaped complementary to the flute 40 and it will be understood that the angular disposition of the transverse key aperture 28 is also complementary to the flute 40 so as to permit for the engagement of the key end 32 in the flute 40.

Figure 4:
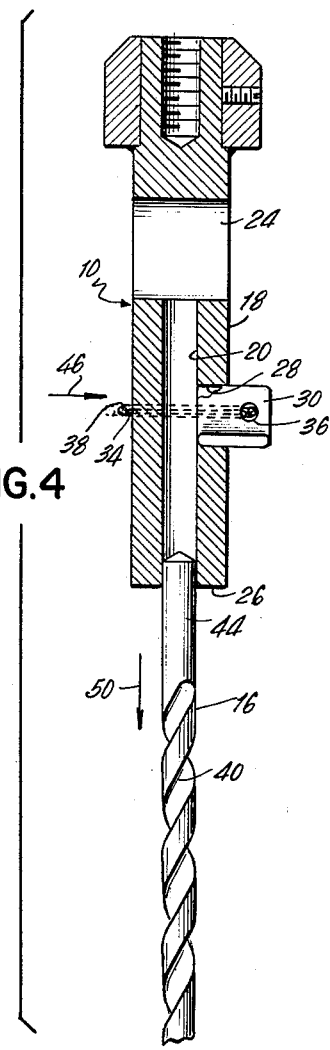
FIGURE 4 is a view similar to FIGURE 3 showing the drill being removed from the chuck.
Figure 5:
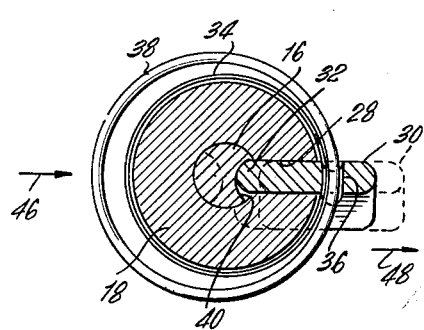
FIGURE 5 is a sectional view taken on the line 5—5 of FIGURE 3.

In utilizing the chuck 10 of the present invention for insertion or removal of a twist drill 16, the ring or annular member 38 is utilized to withdraw the key 30 sufficiently from the bore 20 so as to permit for the insertion or removal of a drill 16 into or from the bore 20. More specifically, and as best shown in FIGURE 5, by urging the rigid ring 38 in the direction of the arrow 46 by manual pressure on the ring 38, the key 30 may be moved from the full line position thereof, as shown in FIGURE 5, to the broken line position thereof, as shown in said figure, said movement being effected in the direction of the arrow 48. This will disengage the end 32 of the key 30 from the flute 40 of a drill 16 disposed within the chuck body 18, so that a drill 16 disposed within bore 20 may be manually withdrawn therefrom as indicated by the arrow 50 in FIGURE 4. In order to insert a new drill 16 into the chuck 10, the shaft end 44 of the drill is inserted into bore 20 at the lower end 26 of the chuck body and by applying pressure on the annular member 38 in the direction of the arrow 46 the key 30 is retracted from the bore 20 so that the drill can be moved upwardly into the bore 20 until the drill shaft 44 engages the upper wall 22 of the slot 24. This can be readily observed through the transverse slot 24. With the drill properly positioned in the bore 20, the pressure exerted on the annular member 38 in the direction of arrow 46 is released and the inner end 32 of key 30 will then engage into flute 40 adjacent to the key aperture 28 under the bias of the spring 34 which is exerted in a direction opposite that illustrated by the arrow 46.

In view of the foregoing, it will be readily apparent that there has been illustrated and described a highly novel chuck 10 having means to effect the manual insertion and removal of a drill 16 therefrom without the necessity of any tools and which insertion or removal can readily be accomplished with a minimum expenditure of time.

While I have illustrated and described the presently preferred embodiment of my invention, it will be apparent that changes and modifications may be made therein without however departing from the spirit and scope of the invention as set forth in the appended claims.

I claim:

1. A drill chuck comprising an elongated chuck body having an axial bore defined therein adapted to removably receive a fluted twist drill, a slot defined in said body, said slot extending transversely of said bore from the outer surface of said body to said bore and lying in a plane which is disposed at an angle relative to the axis of said bore, said angle being complementary to the drill flute, a relatively flat key movably mounted in said slot, the inner end of said key being complementary to the drill flute, the outer end of said key projecting from the chuck body when the inner end thereof is engaged in the drill flute, and spring means encompassing said body and engaged with said outer end for biasing said key into said slot to engage the inner end of the key in the flute of a drill mounted in said bore.

2. A drill chuck as in claim 1, and a rigid member encompassing said chuck body and engaged with said outer end for withdrawing the inner end of said key from said bore against the bias of said spring means.

3. A drill chuck as in claim 2, both said spring means and said rigid member being of annular conformation.

4. A drill chuck as in claim 3, said outer end of said key having an aperture defined therein in which both said spring means and said rigid member are engaged.

5. A drill chuck as in claim 2, said rigid member being an annular member which is mounted eccentrically relative to said chuck body whereby, during the rotation of said chuck body, the centrifugal force exerted by said annular member urges said key into the drill flute.

References Cited in the file of this patent

UNITED STATES PATENTS

| | | |
|---|---|---|
| 1,921,694 | Normand | Aug. 8, 1933 |
| 2,399,425 | Bozard | Apr. 30, 1946 |
| 2,436,881 | Donahue | Mar. 2, 1948 |

FOREIGN PATENTS

| | | |
|---|---|---|
| 908,319 | France | Sept. 3, 1945 |